United States Patent
Voss et al.

(10) Patent No.: US 12,242,708 B2
(45) Date of Patent: *Mar. 4, 2025

(54) SELECTABLE ITEM INCLUDING A CUSTOMIZED GRAPHIC FOR AN ELECTRONIC MESSAGING APPLICATION

(71) Applicant: Snap Inc., Santa Monica, CA (US)

(72) Inventors: Jeremy Voss, Los Angeles, CA (US); Matthew Colin Grantham, Toronto (CA); Dylan Shane Eirinberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,636

(22) Filed: Feb. 1, 2021

(65) Prior Publication Data
US 2021/0232277 A1 Jul. 29, 2021

Related U.S. Application Data

(63) Continuation of application No. 16/203,334, filed on Nov. 28, 2018, now Pat. No. 10,936,157.
(Continued)

(51) Int. Cl.
*G06F 3/0482* (2013.01)
*G06F 3/04817* (2022.01)
(Continued)

(52) U.S. Cl.
CPC ........ *G06F 3/0482* (2013.01); *G06F 3/04817* (2013.01); *G06F 3/0484* (2013.01);
(Continued)

(58) Field of Classification Search
CPC .. G06F 3/0482; G06F 3/04817; G06F 3/0484; G06T 13/40; H04L 65/403; H04L 51/32
See application file for complete search history.

(56) References Cited

U.S. PATENT DOCUMENTS 5,880,731 A 3/1999 Liles et al.
6,023,270 A 2/2000 Brush, II et al.
(Continued)

FOREIGN PATENT DOCUMENTS

CN 101163118 A 4/2008
CN 105812545 A 7/2016
(Continued)

OTHER PUBLICATIONS

"Korean Application Serial No. 10-2020-7016856, Response filed May 24, 2021 to Notice of Preliminary Rejection mailed Mar. 23, 2021", With English claims, 17 pgs.
(Continued)

*Primary Examiner* — Roberto Borja
(74) *Attorney, Agent, or Firm* — Schwegman Lundberg & Woessner, P.A.

(57) ABSTRACT

Method of causing a selectable item including customized graphic for electronic messaging application starts with a processor generating customized graphics based on user identifiers for a first, a second, and a third client device. Processor causes a communication list interface that includes a group selectable item to be displayed on the first client device. The group selectable item includes the second customized graphic and the third customized graphic. Processor receives a request for a group communication session from the first client device. The request for the group communication session is generated by the first client device when the user of the first client device selects a first portion of the group selectable item displayed on the first client device. Processor causes a communication interface for the group communication session between a group of client devices to be displayed at the first client device. Other embodiments are disclosed.

20 Claims, 14 Drawing Sheets

Related U.S. Application Data

(60) Provisional application No. 62/592,366, filed on Nov. 29, 2017.

(51) Int. Cl.
*G06F 3/0484* (2022.01)
*G06T 13/40* (2011.01)
*H04L 51/04* (2022.01)
*H04L 65/403* (2022.01)

(52) U.S. Cl.
CPC .............. *G06T 13/40* (2013.01); *H04L 51/04* (2013.01); *H04L 65/403* (2013.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,180 B2 | 1/2017 | Neelakantan et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,733,955 B1 | 8/2017 | Curtis et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,848,445 B1* | 11/2020 | Willmann ............. H04L 51/046 |
| 10,936,157 B2 | 3/2021 | Voss et al. |
| 2002/0067362 A1 | 6/2002 | Agostino Nocera et al. |
| 2002/0169644 A1 | 11/2002 | Greene |
| 2004/0015548 A1 | 1/2004 | Lee |
| 2004/0179037 A1 | 9/2004 | Blattner et al. |
| 2005/0162419 A1 | 7/2005 | Kim et al. |
| 2005/0206610 A1 | 9/2005 | Cordelli |
| 2006/0101119 A1* | 5/2006 | Qureshi ................... H04L 51/04 |
| | | 709/206 |
| 2006/0143569 A1 | 6/2006 | Kinsella et al. |
| 2006/0294465 A1 | 12/2006 | Ronen et al. |
| 2007/0113181 A1 | 5/2007 | Blattner et al. |
| 2007/0121867 A1 | 5/2007 | Ozugur et al. |
| 2007/0168863 A1 | 7/2007 | Blattner et al. |
| 2007/0176921 A1 | 8/2007 | Iwasaki et al. |
| 2007/0208802 A1* | 9/2007 | Barman ................. G06F 3/0482 |
| | | 709/203 |
| 2008/0158222 A1 | 7/2008 | Li et al. |
| 2009/0016617 A1 | 1/2009 | Bregman-Amital et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0087230 A1 | 4/2010 | Peh et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |

(56) References Cited

U.S. PATENT DOCUMENTS

| | | | |
|---|---|---|---|
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0111366 A1* | 5/2013 | Silbey | A63F 13/795 715/757 |
| 2013/0201187 A1 | 8/2013 | Tong et al. | |
| 2013/0249948 A1 | 9/2013 | Reitan | |
| 2013/0257877 A1 | 10/2013 | Davis | |
| 2013/0263009 A1* | 10/2013 | Kim | H04M 1/2757 715/739 |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0237382 A1* | 8/2014 | Grandhi | H04L 51/23 715/752 |
| 2015/0206349 A1 | 7/2015 | Rosenthal et al. | |
| 2016/0134840 A1 | 5/2016 | Mcculloch | |
| 2016/0192121 A1 | 6/2016 | Jain et al. | |
| 2016/0234149 A1 | 8/2016 | Tsuda et al. | |
| 2016/0295384 A1* | 10/2016 | Shan | H04W 4/02 |
| 2016/0328140 A1* | 11/2016 | Zhang | G06F 3/0481 |
| 2017/0034226 A1 | 2/2017 | Bostick et al. | |
| 2017/0054664 A1* | 2/2017 | Lee | H04L 51/216 |
| 2017/0080346 A1 | 3/2017 | Abbas | |
| 2017/0083168 A1* | 3/2017 | Linner | H04L 51/22 |
| 2017/0087473 A1 | 3/2017 | Siegel et al. | |
| 2017/0109013 A1 | 4/2017 | Hong | |
| 2017/0113140 A1 | 4/2017 | Blackstock et al. | |
| 2017/0118145 A1 | 4/2017 | Alttoniemi et al. | |
| 2017/0199855 A1 | 7/2017 | Fishbeck | |
| 2017/0201575 A1 | 7/2017 | Song et al. | |
| 2017/0235848 A1 | 8/2017 | Van Dusen et al. | |
| 2017/0310934 A1 | 10/2017 | Du et al. | |
| 2017/0312634 A1 | 11/2017 | Ledoux et al. | |
| 2017/0322693 A1 | 11/2017 | Zhang | |
| 2017/0346777 A1* | 11/2017 | Kim | H04L 51/224 |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0171338 A1 | 6/2019 | Voss et al. | |
| 2019/0188920 A1 | 6/2019 | Mcphee et al. | |

FOREIGN PATENT DOCUMENTS

| | | |
|---|---|---|
| CN | 107103019 A | 8/2017 |
| CN | 109863532 | 6/2019 |
| CN | 110168478 | 8/2019 |
| CN | 111386553 | 7/2020 |
| EP | 2184092 | 5/2010 |
| JP | 2001230801 | 8/2001 |
| JP | 5497931 | 3/2014 |
| KR | 20050047537 | 5/2005 |
| KR | 20060101448 | 9/2006 |
| KR | 20100094021 | 8/2010 |
| KR | 101445263 | 9/2014 |
| KR | 20160104477 | 9/2016 |
| KR | 20160145153 A | 12/2016 |
| KR | 102318422 | 10/2021 |
| KR | 102387861 B1 | 4/2022 |
| KR | 102517427 B1 | 4/2023 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | WO-2016137092 A2 | 9/2016 |
| WO | 2018081013 | 5/2018 |
| WO | 2018102562 | 6/2018 |
| WO | 2018129531 | 7/2018 |
| WO | 2019089613 | 5/2019 |
| WO | 2019108702 | 6/2019 |

OTHER PUBLICATIONS

"International Application Serial No. PCT/US2018/062920, International Search Report mailed Mar. 22, 2019", 5 pgs.

"International Application Serial No. PCT/US2018/062920, Written Opinion mailed Mar. 22, 2019", 6 pgs.

"U.S. Appl. No. 16/203,334, Non Final Office Action mailed Mar. 2,20 20", 17 pgs.

"U.S. Appl. No. 16/203,334, Response filed Jun. 2, 2020 to Non Final Office Action mailed Mar. 2, 2020", 11 pgs.

"International Application Serial No. PCT/US2018/062920, International Preliminary Report on Patentability mailed Jun. 11, 2020", 8 pgs.

"U.S. Appl. No. 16/203,334, Final Office Action mailed Jun. 29, 2020", 18 pgs.

"U.S. Appl. No. 16/203,334, Response filed Sep. 29, 2020 to Final Office Action mailed Jun. 29, 2020", 12 pgs.

"U.S. Appl. No. 16/203,334, Notice of Allowance mailed Oct. 26, 2020", 10 pgs.

"Chinese Application Serial No. 201880076357.4, Voluntary Amendment Filed Oct. 13, 2020", 15 pgs.

"Korean Application Serial No. 10-2020-7016856, Notice of Preliminary Rejection mailed Mar. 23, 2021", w/ English Translation, 11 pgs.

U.S. Appl. No. 16/203,334 U.S. Pat. No. 10,936,157, filed Nov. 28, 2018, Selectable Item Including a Customized Graphic for an Electronic Messaging Application.

"Korean Application Serial No. 10-2022-7012353, Notice of Preliminary Rejection mailed Jun. 24, 2022", With English translation, 13 pgs.

"Korean Application Serial No. 10-2022-7012353, Response filed Aug. 24, 2022 to Notice of Preliminary Rejection mailed Jun. 24, 2022", w/ English Claims, 18 pgs.

"Life 360 application, family member location tracker—a social function is added to a location sharing function", Blog, Official Samsung Smartphone Internet Cafe, [Online] Retrieved from the internet: <https://m.blog.naver.com/PostView.naver?isHttpsRedirect=true&blogId=mutantcell&logNo=203369987>, (Jan. 28, 2014), 14 pgs.

"Chinese Application Serial No. 201880076357.4, Office Action mailed Mar. 20, 2023", w/ English Translation, 19 pgs.

"Chinese Application Serial No. 201880076357.4, Response filed Aug. 4, 2023 to Office Action mailed Mar. 20, 2023", w English Claims, 18 pgs.

"Chinese Application Serial No. 201880076357.4, Office Action mailed Sep. 14, 2023", w English Translation, 24 pgs.

"Chinese Application Serial No. 201880076357.4, Office Action mailed Jan. 6, 2024", W/English Translation, 26 pgs.

"Korean Application Serial No. 10-2023-7010895, Notice of Preliminary Rejection mailed Nov. 14, 2023", w/ English Translation, 6 pgs.

"Chinese Application Serial No. 201880076357.4, Request for Reexamination filed Jul. 1, 2024", W/O English Claims, 8 pgs.

"Korean Application Serial No. 10-2023-7010895, Notice of Preliminary Rejection mailed Jun. 4, 2024", w/ English Translation, 15 pgs.

"Korean Application Serial No. 10-2023-7010895, Response Filed Aug. 2, 2024 to Notice of Preliminary Rejection mailed Jun. 4, 2024", w/ English Claims, 22 pgs.

(56) References Cited

OTHER PUBLICATIONS

"Chinese Application Serial No. 201880076357.4, Response filed Mar. 21, 2024 to Office Action mailed Jan. 6, 2024", with English claims, 12 pages.

"Chinese Application Serial No. 201880076357.4, Decision of Rejection mailed Mar. 30, 2024", with English translation, 23 pages.

* cited by examiner

RONDA B.

SAMMY  23,654  🏆

ADDED ME

ADD FRIENDS

MY FRIENDS

SELECTABLE ITEM INCLUDING A CUSTOMIZED GRAPHIC FOR AN ELECTRONIC MESSAGING APPLICATION

CROSS-REFERENCE TO RELATED APPLICATIONS

This application is a continuation of U.S. patent application Ser. No. 16/203,334, filed Nov. 28, 2018, which claims the benefit of priority to U.S. Provisional Patent Application Ser. No. 62/592,366, filed Nov. 29, 2017, the contents of each of which are incorporated herein by reference in their entireties.

BACKGROUND

The popularity of electronic messaging, particularly instant messaging, continues to grow. Users increasingly use customized avatars within electronic messages such as texts and emails reflecting a global demand to communicate more visually.

These customized avatars can be personalized by the users to represent the users in various applications, video games, messaging services, etc. Since the customized avatars can be generated in a different array of situations, displaying various emotions, or even be animated, the users are able to communicate their feelings more accurately in messages using the customized avatars.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by causing an interface that includes a group selectable item to be displayed that represent a group of users in a group communication session. The group selectable item includes a thumbnail of customized graphics. The customized graphic may include avatars representing the users in the group of users. In lieu of the avatars representing the users in the group of users, the customized graphic may include a preview of media content items that have been added by at least one of the users to a collection of media content items (e.g., a group story). Further, selection of the group selectable item by a user in the group causes a communication interface for the group communication session to be displayed. Accordingly, by including a group selectable item in the user interface that allows the users of the group to efficiently determine whether new media items have been added to the group story, whether new electronic messages have been added to the group communication session, as well as provide a visual representation of the identity of the users in the group via the avatars in the thumbnail, the functionality of the messaging server system is improved.

By involving the user's avatars in the communication session, the messaging system provides the users new way to communicate using the system. Since the group selectable item improves the ease of use of the system for the user and provides better access to new media items and electronic messages, the system is further improved in that it may increase the engagement of users with the system as well as increase the length of time the users maintain presence on the system.

Figure 1:
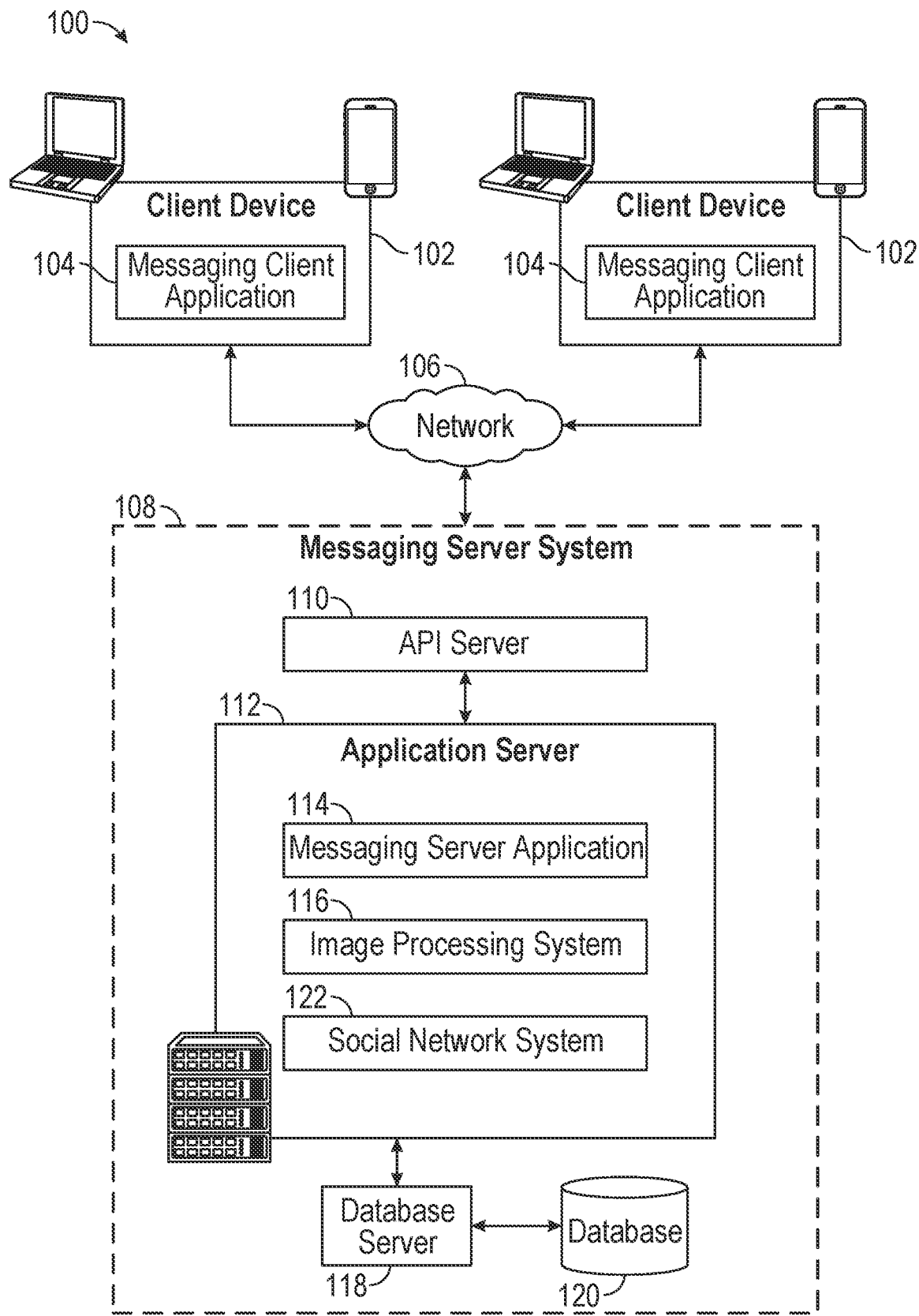
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
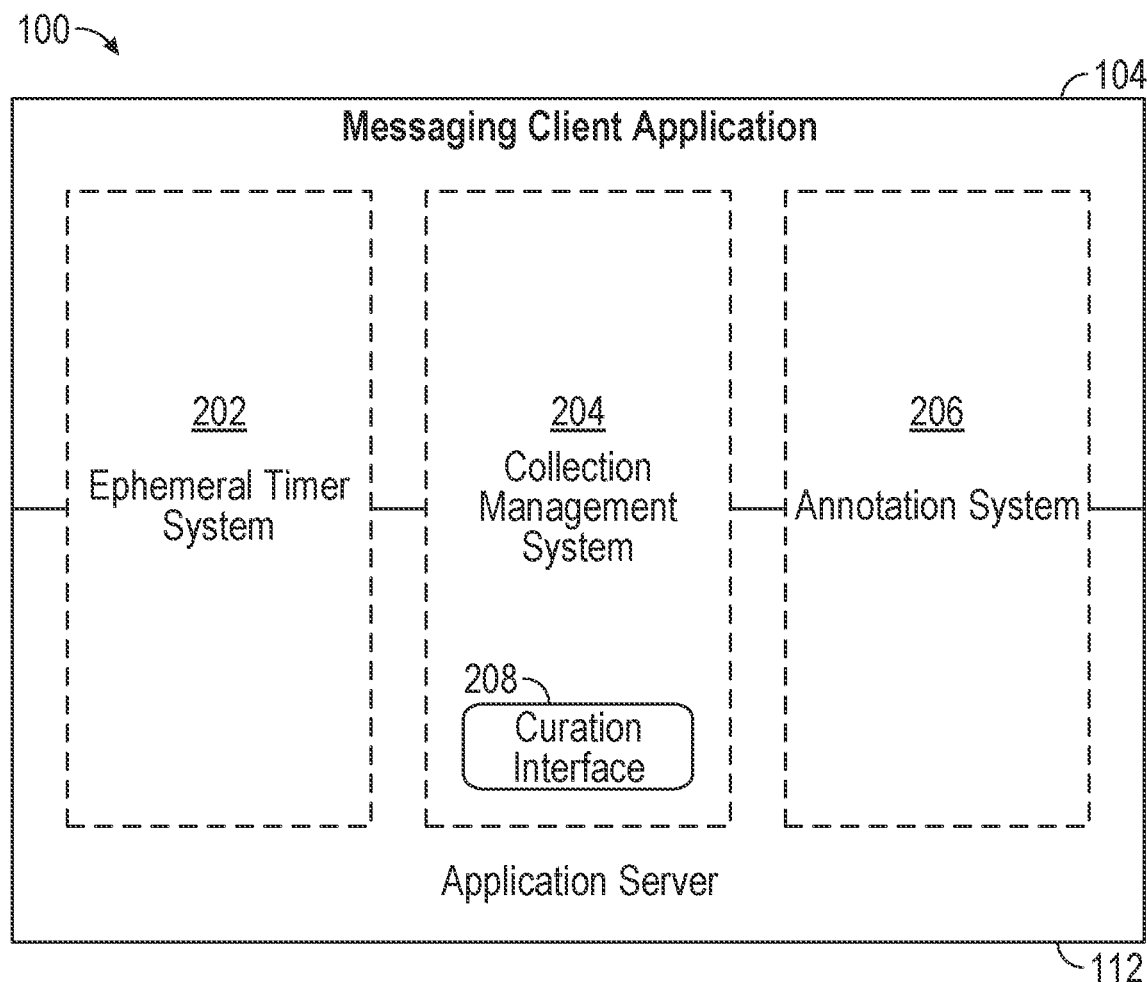
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
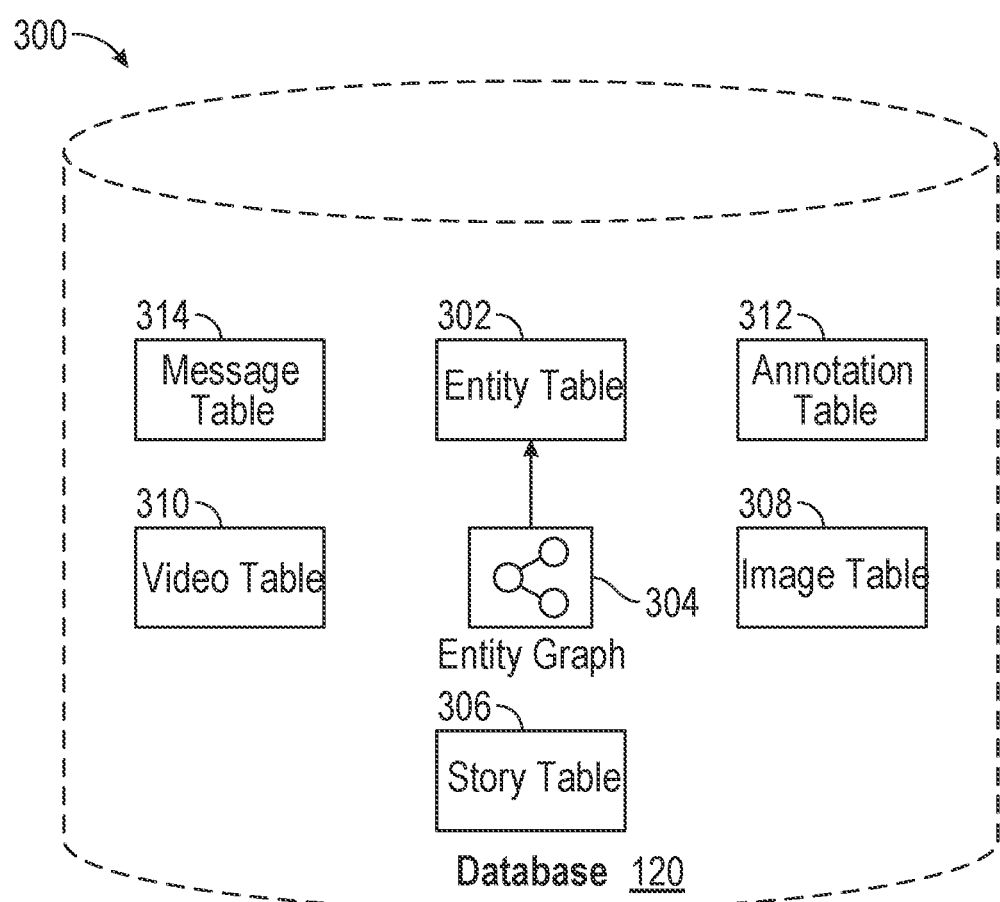
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

As used herein, an "electronic message" may refer to any message in electronic form, such as an email, a short message service (SMS) message, a multimedia message service (MMS) message, an instant message (IM), Internet Relay Chat (IRC) messages, as well as any other form of real-time, near-real-time, synchronous, or asynchronous electronic messaging format. Embodiments of the present disclosure may generate and present customized images for use within electronic messages such as SMS or MMS texts and emails. The customized images may also be utilized in conjunction with the stories, filters, and ephemeral messaging functionality discussed herein.

Figure 4:
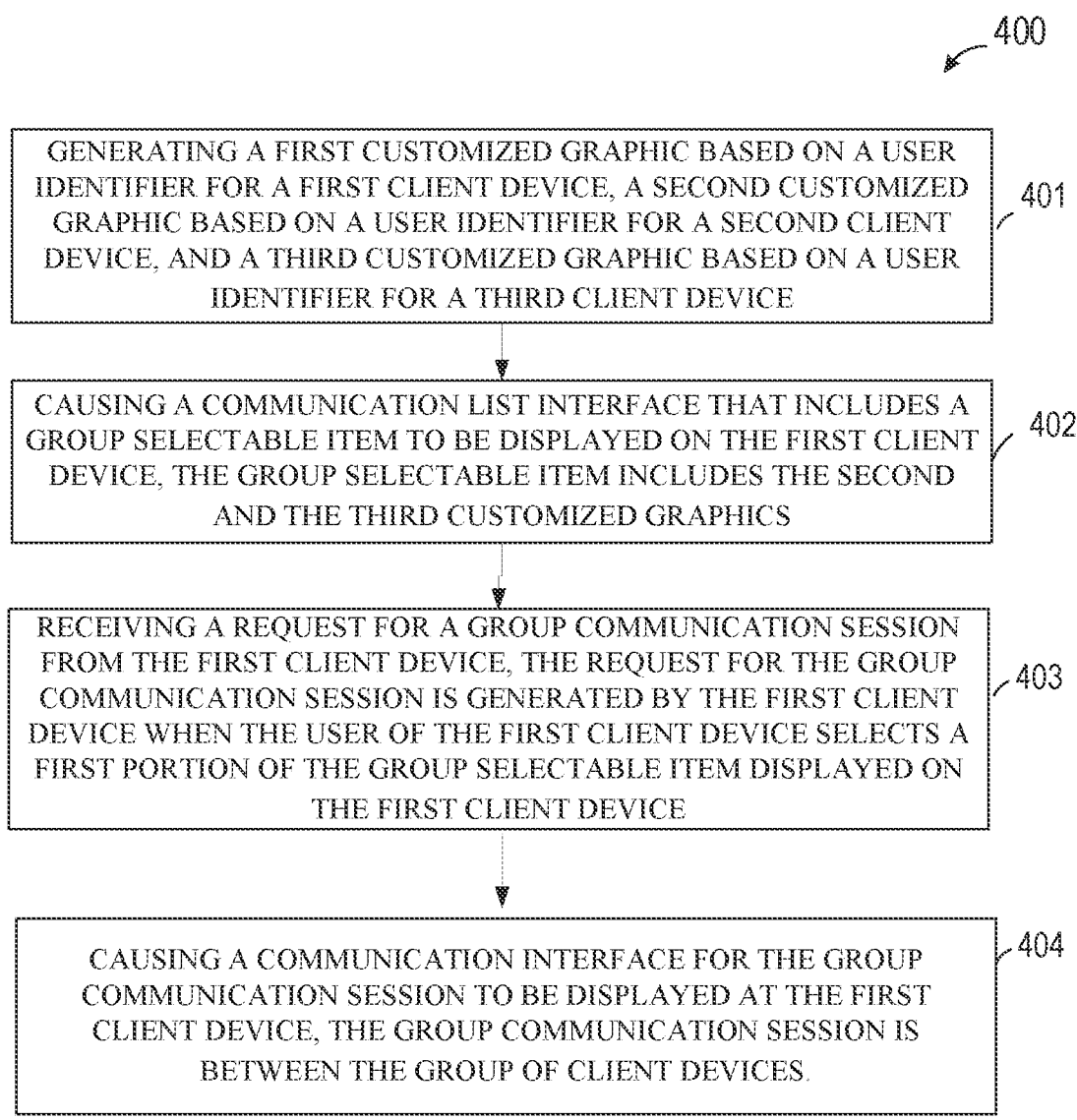
FIG. 4 is an exemplary flow diagram of a process according to various aspects of the disclosure.

FIG. 4 is an exemplary flow diagram of a process according to various aspects of the disclosure. Although the flowchart may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in FIG. 1 and/or FIG. 7.

FIG. 4 depicts an exemplary process 400 of generating a selectable item including a customized graphic for an electronic messaging application according to various aspects of the present disclosure. The process 400 may be performed by a processor included in the application server of the messaging server system or by a processor included in a client device.

In one example, at Block 401, the processor generates customized graphics based on user identifiers for client devices. For example, the processor may generate a first customized graphic based on a user identifier for a first client device, a second customized graphic based on a user identifier for a second client device, and a third customized graphic based on a user identifier for a third client device. In one embodiment, to generate the first, second, and third customized graphics, the processor retrieves user identifiers for the first, second, and third client devices, respectively. The user identifiers are retrieved by analyzing one or more identifiers associated with the users of the first, second, and third client devices, respectively, that are stored within a memory of the system.

In one embodiment, the first customized graphic includes a first avatar associated with a user of the first client device ("first user"), the second customized graphic includes a second avatar associated with a user of the second client device ("second user"), and the third customized graphic includes a third avatar associated with a user of the third client device ("third user").

As used herein, an "avatar" of a user is any visual representation of user. The avatar of a user or individual may be any image resembling or otherwise associated with the user or individual. The avatar of a user may be based on characteristics derived from images of the user in conjunction with the avatar characteristics identified from the user's relationships with other users. Alternatively or additionally, the user may select and customize characteristics of the user's avatar via the user's computing device (i.e., customized avatar characteristics). Such customized avatar characteristics may include, for example, the user's bodily features (e.g., muscular, thin, etc.), facial features, clothing and accessories, text displayed in conjunction with the avatar, and images displayed in conjunction with the avatar. The avatar characteristics may be received or retrieved from a variety of sources, such as the local memory of a client device 102 as well as from other systems and devices, such as a database or server.

Figure 5A:
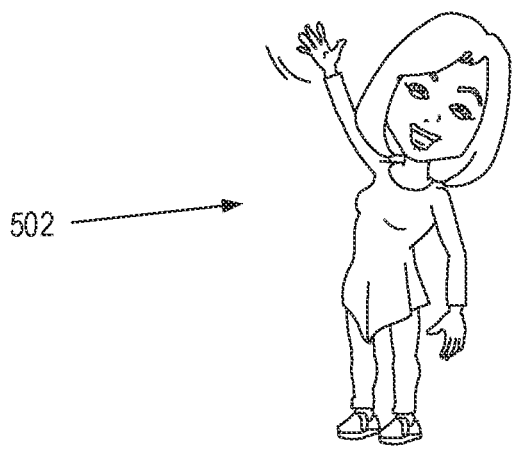
FIGS. 5A-5I are exemplary interfaces according to various aspects of the disclosure.
Figure 5A:

FIG. 5A illustrates an example interface that is displayed on the first client device for the user of the first client device to customize the user's avatar. As shown in FIG. 5A, the interface 501 includes a current avatar 502 of the first user ("first avatar") and selectable items 503-506. The selectable items 503-506 include an avatar edit item 503 for the first user to edit the facial and body features of the first avatar, an outfit change item 504 for the first user to edit the clothing and accessories of the first avatar, a selfie change item 505 for the first user to change the first avatar headshot that is used as thumbnail in a user identity card and the group identity cards, and an unlink avatar item 506 for the first user to delete the first avatar. In one embodiment, in response to the first user selecting the unlink avatar item 506, the processor deletes a connection between an avatar server including information related to the first user and the first avatar and the messaging server system.

Figure 5B:
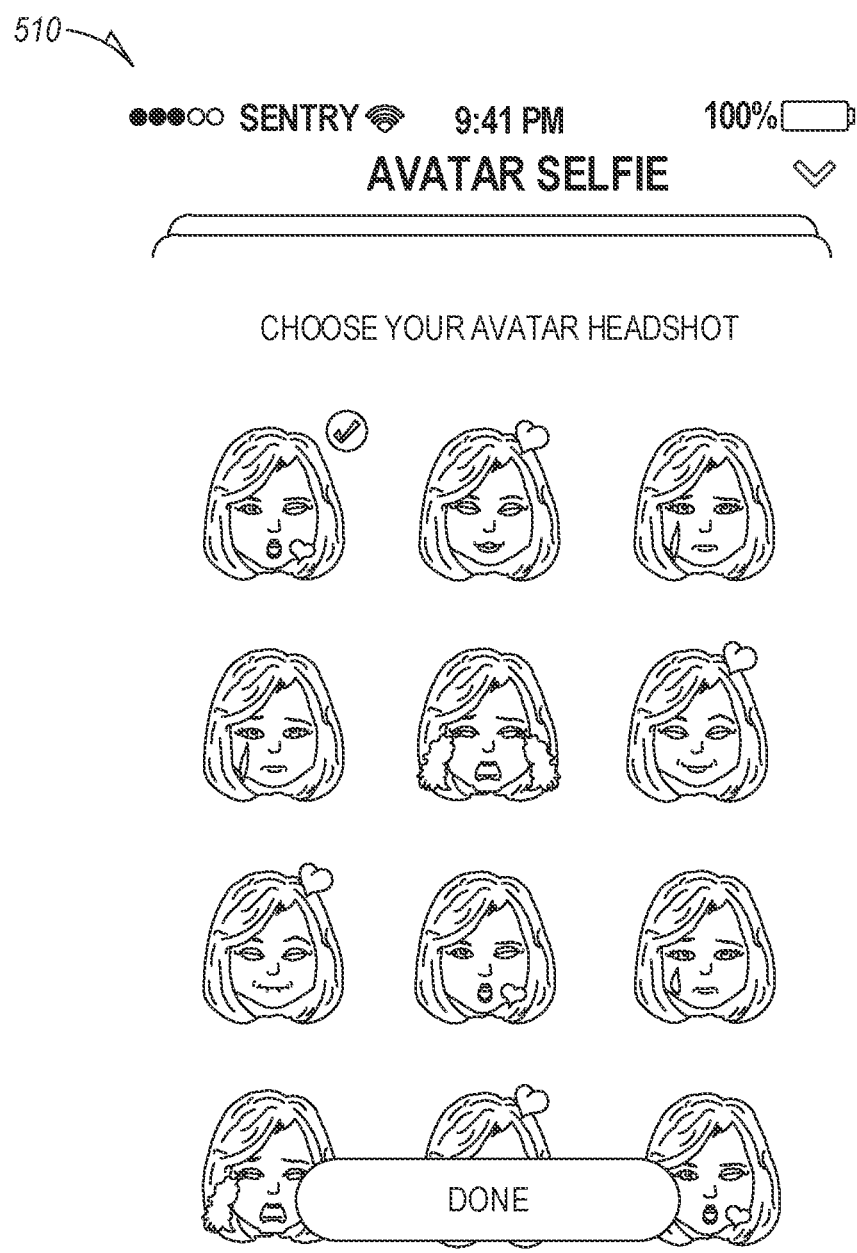
Figure 5C:
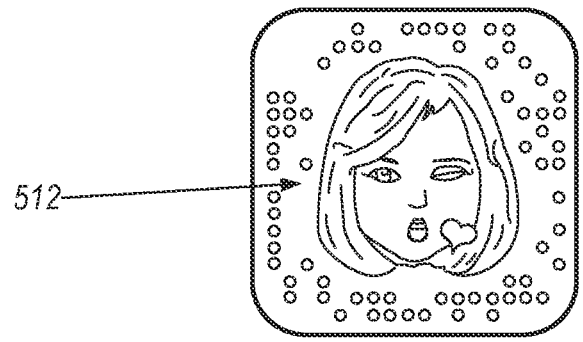

FIG. 5B illustrates an example interface 510 that is displayed on the first client device for the first user when the first user selects the selfie change item 505. The interface 510 includes a plurality of first avatar headshots that are different permutations of the first avatar's face. The different permutations include the first avatar's face exhibiting different emotions and expressions.

Using this interface 510, the first user may select (e.g., by tapping on top of or around) one of the first avatar headshots. The selected first avatar headshot from interface 510 may be used in conjunction with a barcode or matrix barcode (e.g., QR code) that represents the first user in the messaging server system. Figure SC illustrates an example interface 511 that is displayed on the first client device according to some embodiments. The interface 511 includes code item 512 that includes the first avatar headshot used in conjunction with the matrix barcode that represents the first user.

The selected first avatar headshot from interface 510 may also be used as the first user's thumbnail in the messaging server system. For example, the selected first avatar headshot may be used in the header in the messaging server system or messaging application, in the first user's identity card, and in group identity cards for groups that include the first user as a member.

Figure 5D:
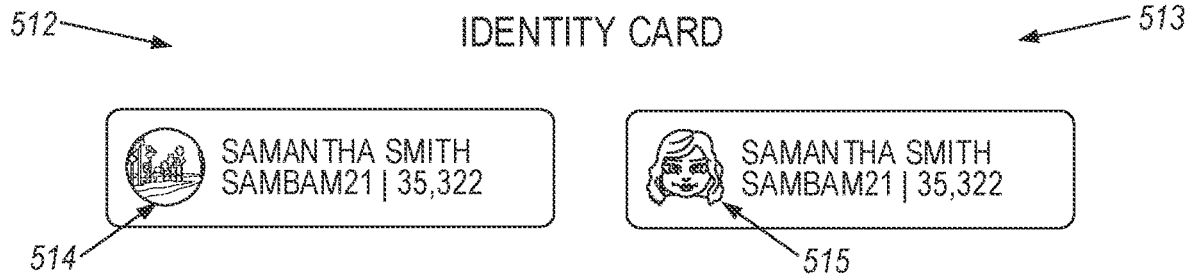

FIG. 5D illustrates examples of an identity card 512, 513 that are displayed on the first client device according to some embodiment. For example, the identity cards 512, 513 are associated with the user of the second client device ("second user") and is a connection (e.g., friend) of the first user on the messaging server system. The identity card 512 is displayed to other users including the first user on the messaging server system when the second user has an active story. An active story is a story that includes a media content item that is still accessible to be viewed. Media content items include, for example, images, video, text and audio. In one embodiment, the media content items may be added to a collection of media data (e.g., a story). The identity card 512 includes a preview 514 of the media content item that is still accessible to be viewed.

The identity card 513 is displayed to other users on the messaging server system when the second user does not have an active story. The identity card 513 includes an avatar headshot as a thumbnail 515. In this example, the second user selected a second avatar headshot from an interface 510 in FIG. 5B displayed on the second client device. As shown in FIG. 5D, the thumbnail 515 replaces the preview 514 in identity card 513 when the second user does not have an active story and the preview 514 replaces the thumbnail 513 in identity card 512 when the second user does have an active story. Accordingly, the first user is able to quickly determine whether the second user has updated her story based on the identity card 512 or 513 that is being displayed on the first client device.

Figure 5E:
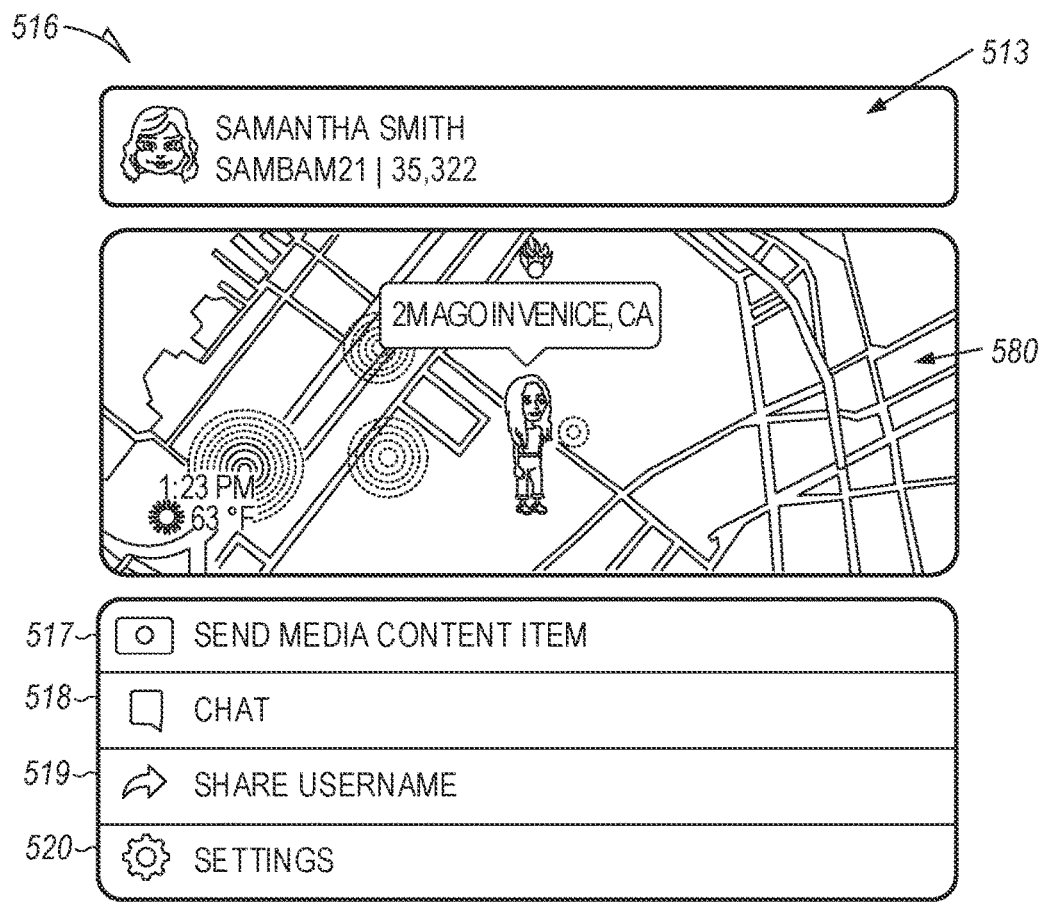
Figure 5F:
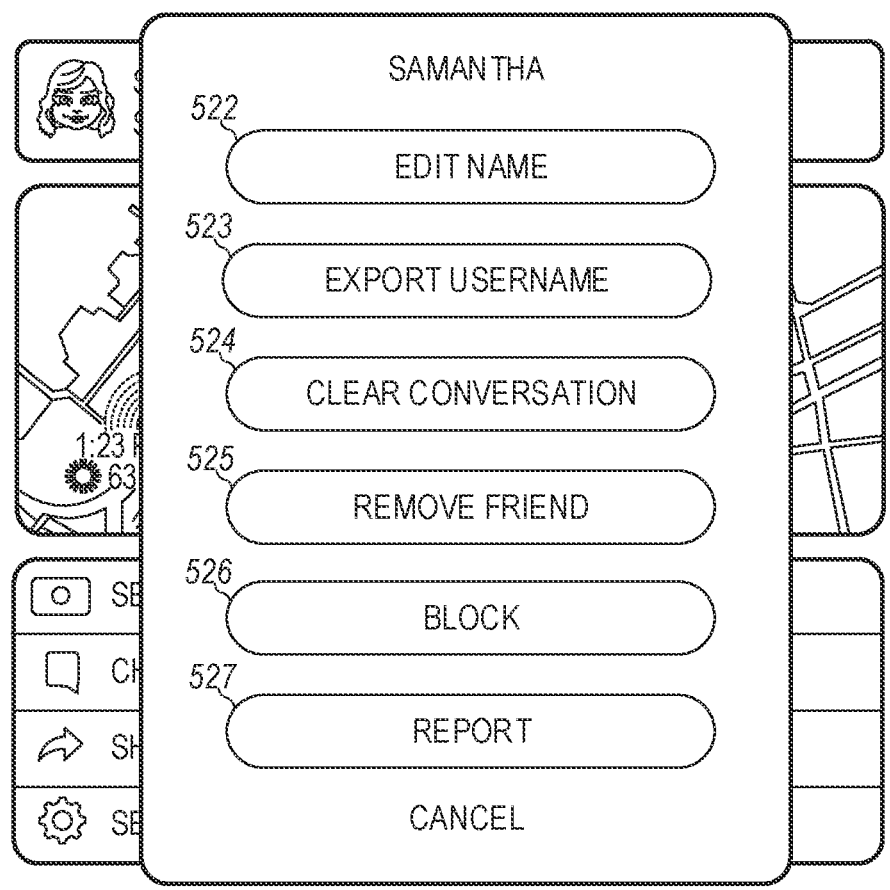

FIG. 5E illustrates an example interface 516 that is displayed on the first client device according to one embodiment. The interface 516 includes the identity card 513, a map 580 that shows the location of the second user. The location of the second user is marked using the second avatar. The interface 516 also includes the selectable items 517-520. Item 517 allows the first user to send a media content item directly to the second client device, item 518 allows the first user to receive and send electronic messages to the second client device, item 519 allows the first user to share the second user's information (e.g., username) with another user on the messaging server system, and item 520 allows the first user to control settings associated with the second user. FIG. 5F illustrates an example interface 521 is an individual settings interface that is displayed on the first client device when the item 520 is selected on interface 516 according to one embodiment. Interface 521 includes selectable items 522-527 that allow the first user to edit the display of second user's name on the first client device (e.g., "Edit Name" item 522), export the second user's name (e.g., "Export Username" item 523), clear the electronic messages in the communication session with the second user (e.g., "Clear Conversation" item 524), delete a connection on the messaging server system between the first and second users (e.g., "Remove friend" item 525), block connections on the messaging server system between the first and second users (e.g., "Block" item 526), and report to the messaging server system inappropriate behavior associated with the second user (e.g., "Report" item 527).

Figure 5G:
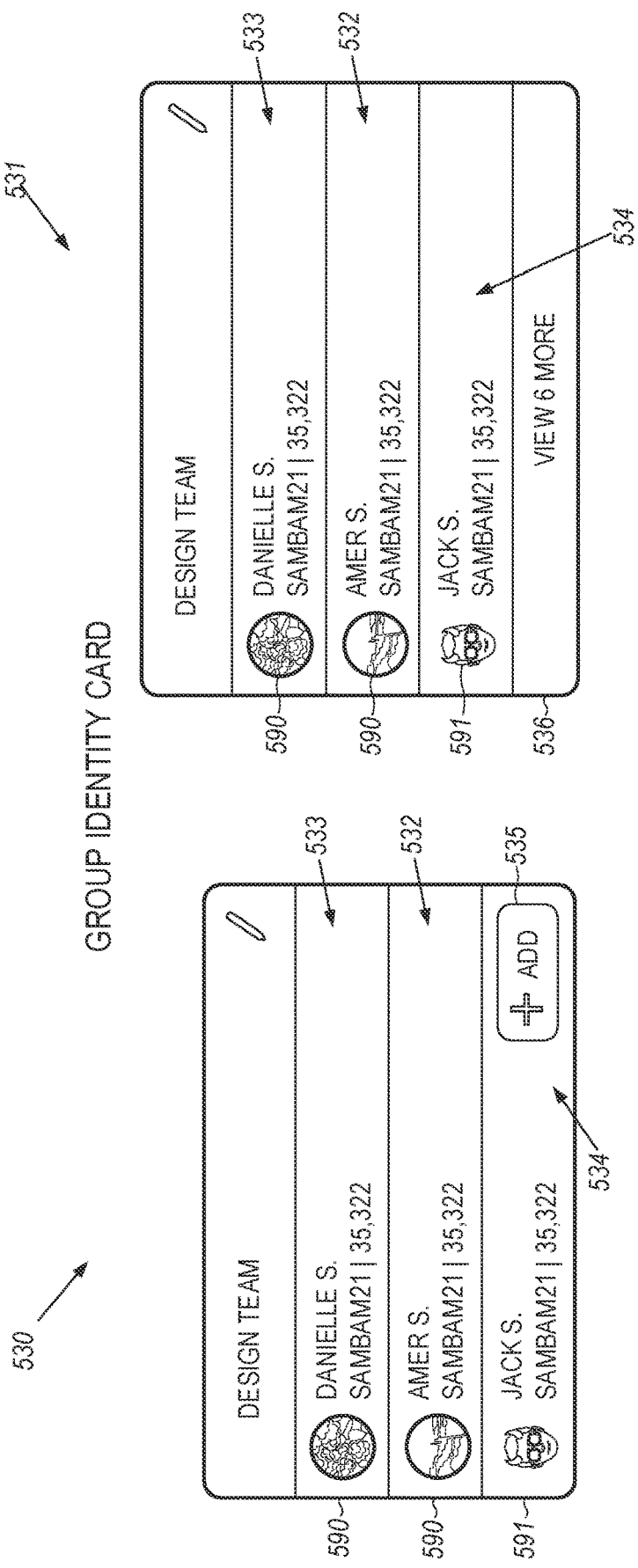

Similar to the individual identity cards, the avatar headshots for each user included in a group may be also used in a group identity card. FIG. 5G illustrates example group identity cards 530, 531 that are displayed on the first client device according to one embodiment. The group identity cards 530, 531 are associated with the "Design Team" group.

The group identity cards 530, 531 include the user identity cards 532-534 of three users included in the "Design Team" group. In group identity card 530, the user identity card 534 includes a selectable add item ("+Add" item 535) that when selected, allows the first user to add the user associated with the user identity card 534 to be connected to the first user on the messaging server system. In group identity card 531, a selectable item 536 ("View 6 More") allows the first user to expand the group identity card 531 to display the user identity cards associated with 6 more users that are in the "Design Team" group.

As shown in group identity cards 530, 531, the users associated with user identity cards 532-533 have active stories because the user identity cards 532-533 include the preview 590 of media content items from the users, respectively, that are still accessible to be viewed. In contrast, the user associated with user identity card 534 does not have an active story because the user identity card 534 includes the thumbnail 591. The thumbnail 591 includes the avatar associated with the corresponding user.

Referring back to FIG. 4, at Block 402, the processor causes a communication list interface that includes a group selectable item to be displayed on the first client device.

Figure 5H:
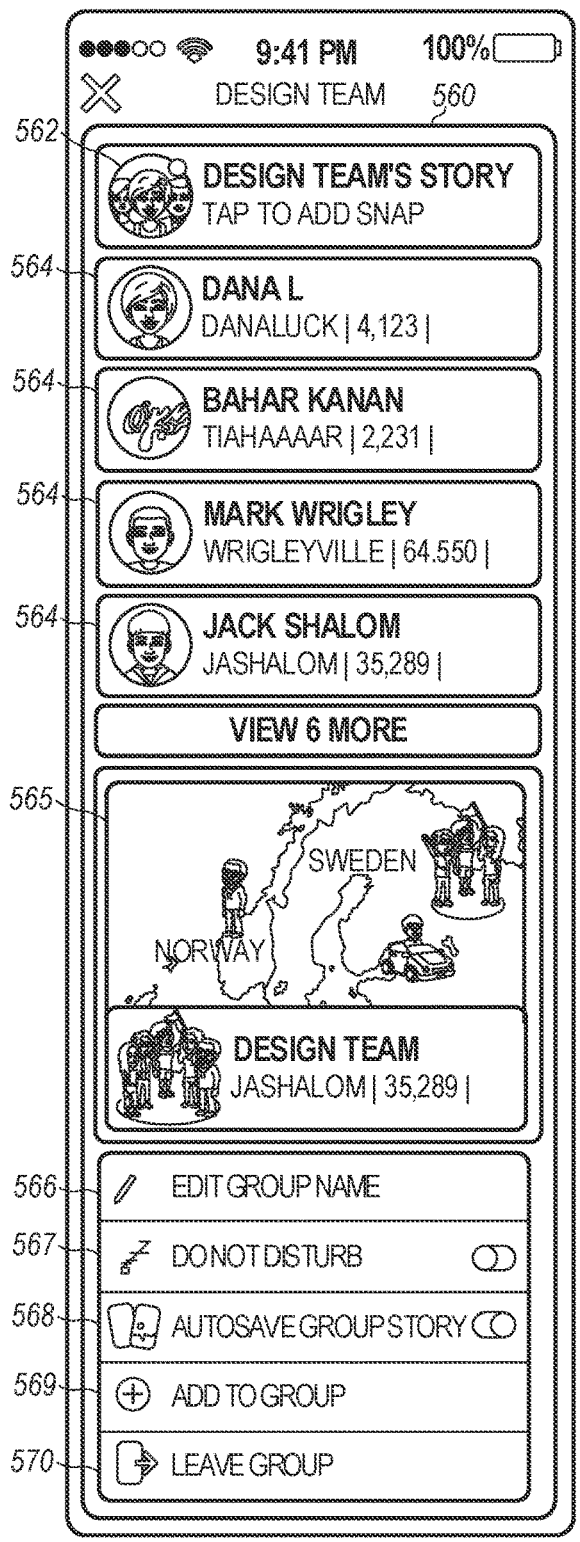
Figure 5H:
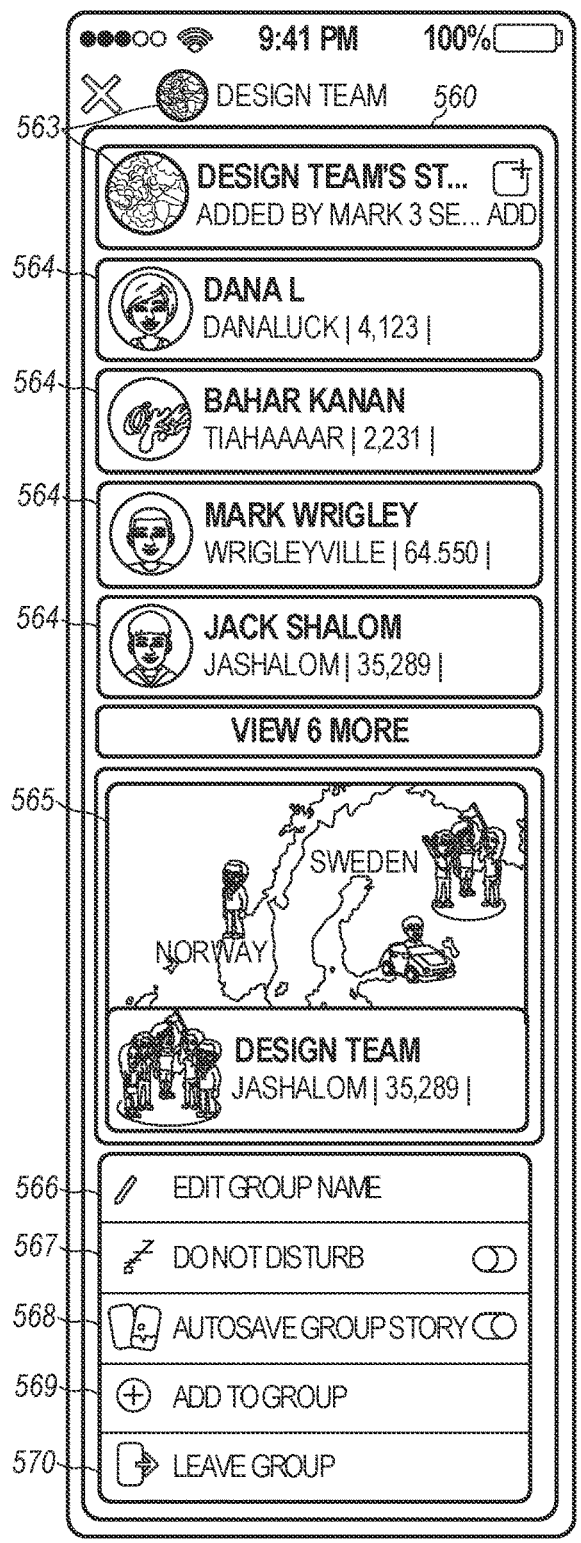
Figure 5I:
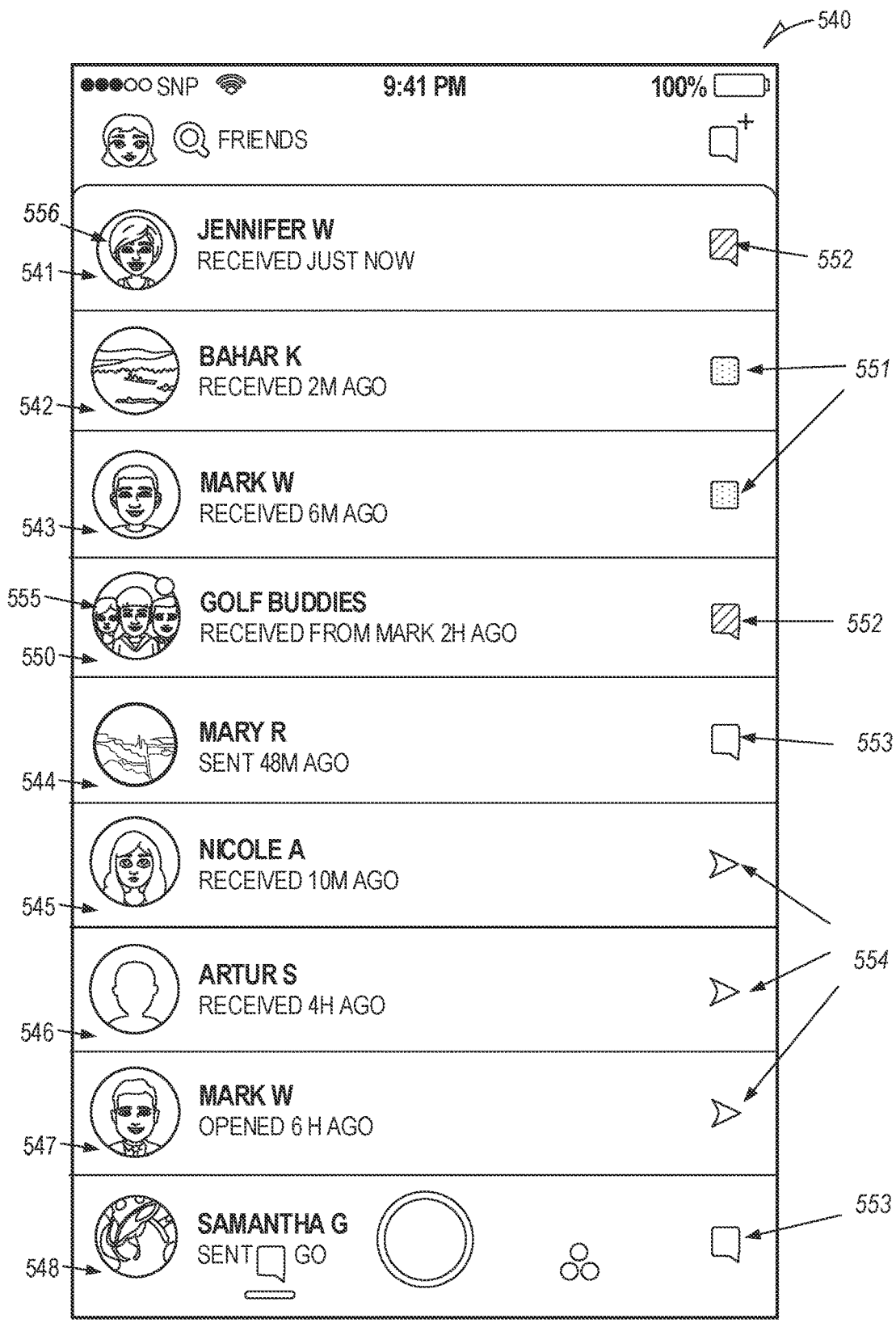

FIG. 5I illustrates an exemplary communication list interface 540 displayed on a first client device associated with a user included in the group. The interface 540 in FIG. 5I includes a plurality of selectable items 541-548 associated with users of other client devices that have communicated with the user of the first client device on the messaging server system. In this example, the first user is included the group "Golf Buddies." In FIG. 5I, a group selectable item 550 is shown for the group "Golf Buddies" and the new message indication 552 is a filled in (or colored in) text bubble in this example to indicate that a new electronic message has been added to the group communication session.

The group selectable item 550 also includes the thumbnail 555 that includes the second customized graphic (e.g., "second avatar") and the third customized graphic (e.g., "third avatar"). In the example in FIG. 5I, the second avatar partially overlaps the third avatar in thumbnail 555 in the group selectable item 550 displayed on the first client device.

In FIG. 5I, the selectable items 544-547 below the "Golf Buddies" selectable item 550 do not have a new item indication. In the example in FIG. 5I, in lieu of the new item indication, the selectable items 544-547 include indicators 553 and 554 that are grayed out.

At Block 403 of FIG. 4, the processor receives a request for a group communication session from the first client device. The request for the group communication session is generated by the first client device when the user of the first client device selects a first portion of the group selectable item displayed on the first client device.

For example, in FIG. 5I, the first may activate via a touch screen a first portion of the group selectable item that indicates that the first user requests the "Golf Buddies" group communication session. For example, a first portion of the group selectable item may be the portion around the words "Golf Buddies" or the new message indication 552.

At Block 404 of FIG. 4, the processor causes a communication interface for the group communication session to be displayed at the first client device. The group communication session is between the group of client devices. For example, the communication interface may include a virtual keyboard to receive the first user's content for an electronic message to the "Golf Buddies" group communication session.

In one embodiment, the processor receives content for an electronic message from the first client device to the group of client devices via the communication interface for the group communication session. In response to the content for the electronic message being received, the processor causes the group selectable item including a new message indication 522 to be displayed by the second client device and the third client device, respectively.

In one embodiment, the communication list interface displayed on the first client device may further include an individual selectable item associated with the second client device that includes the second customized graphic ("second avatar"). For example, FIG. 5I includes individual selectable item 541 associated with a second user (e.g., "Jennifer W.") that includes an avatar of the second user at item 556.

In this embodiment, the processor further receives from the first client device a request for an individual communication session. The request is generated by the first client device when the user of the first client device selects a first portion of the individual selectable item associated with the second client device that is displayed on the first client device. The processor causes the communication interface for the individual communication session to be displayed at the first client device. The individual communication session is between the first client device and the second client device.

In one embodiment, the processor receives a group details request from the first client device. The group details request is generated by the first client device when the user of the first client device selects a second portion of the group selectable item displayed on the first client device. Referring to FIG. 5H, for example, the user of the first client device that is part of a "Design Team" group may activate a portion of the "Design Team" group selectable item that indicates that he wants to view the details and settings associated with the "Design Team" group. In one embodiment, the second portion of the group selectable item is a circle on the group selectable item. In one embodiment, the second portion of the group selectable item is the circle on the group selectable item when there is no new media content item (e.g., media content item that is no seen by the user of the first client device) added to the group story.

In response to the group details request being received, the processor causes a group card interface to be displayed by the first client device. FIG. 5H illustrates two example group card interfaces 537 and 538 that are displayed on the first client device. The left group card interface 537 is the group card that is displayed when there is no active story in the group and the right group card interface 538 is the group card that is displayed when there is an active story in the group. An active story is a story that includes a media content item that is still accessible to be viewed. The difference between the group card interfaces in FIG. 5H appears in the selectable item 560 and 561 (e.g., "Design Team's Story") that is at the top of each of the group card interfaces. When there is an active story (right), the preview of the media content item in the story appears in the circle 563 whereas when there is no active story (left), the circle 562 may include the avatars of the users in the group.

As shown in FIG. 5H, the group card interface 537, 538 may include selectable items 564 associated with each user of a client device included in the group. The group card interface 537, 538 also includes a map 565 that shows the locations of the client devices in the group. In one example, the map 565 includes the avatars of the users of the client devices in the group. The group card interface 537, 538 may also include, for example, a location sharing item (not shown) that allows a location of the first client device to be shared with the group (e.g., "Share My Location" item), a group name editing item 566 to edit a name of the group (e.g., "Edit Group Name" item), a mute item (not shown) that allows the first client device to stop receiving notifications associated with media content item from the group, (e.g., "Mute Story" item), a do not disturb item 567 that allows the first client device to stop receiving notifications associated with the group (e.g., "Do Not Disturb" item or toggle switch), a clear electronic messages item (not shown) that allows the first client device to clear the electronic messages in the communication session (e.g., "Clear Conversation" item), an add member item 569 that allows the first client device to add a fourth client device to the group (e.g., "Add to Group" item), or a leaving group item 570 that allows the first client device to remove the first client device from the group (e.g., "Leave Group" item). The group card interface 537, 538 may also include, for example, a story save item 568 that allows the first client device to automatically save the media content items that are added to the group story (e.g., "Autosave Group Story" item 568 or toggle switch).

Software Architecture

Figure 6:
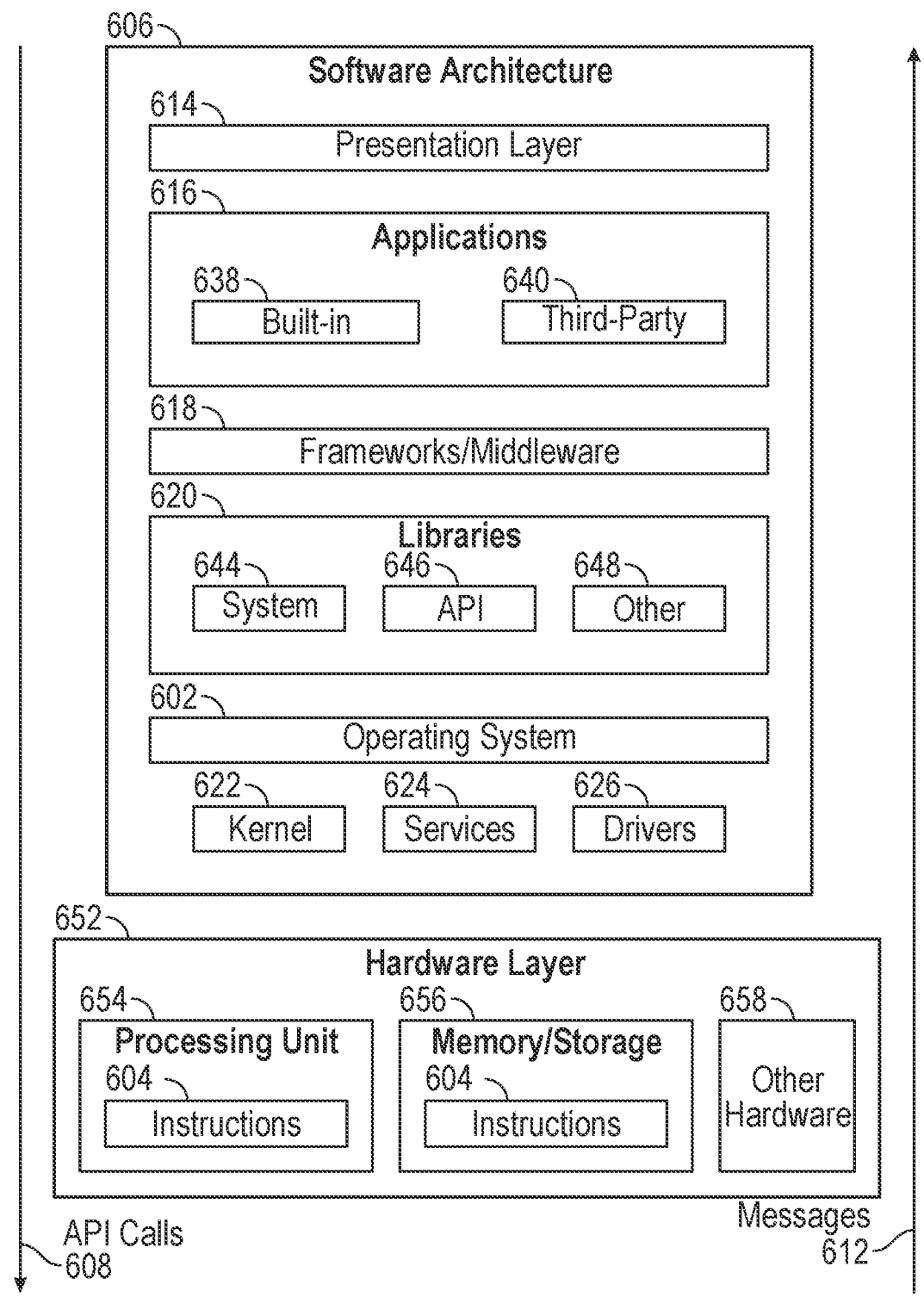
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7.

The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
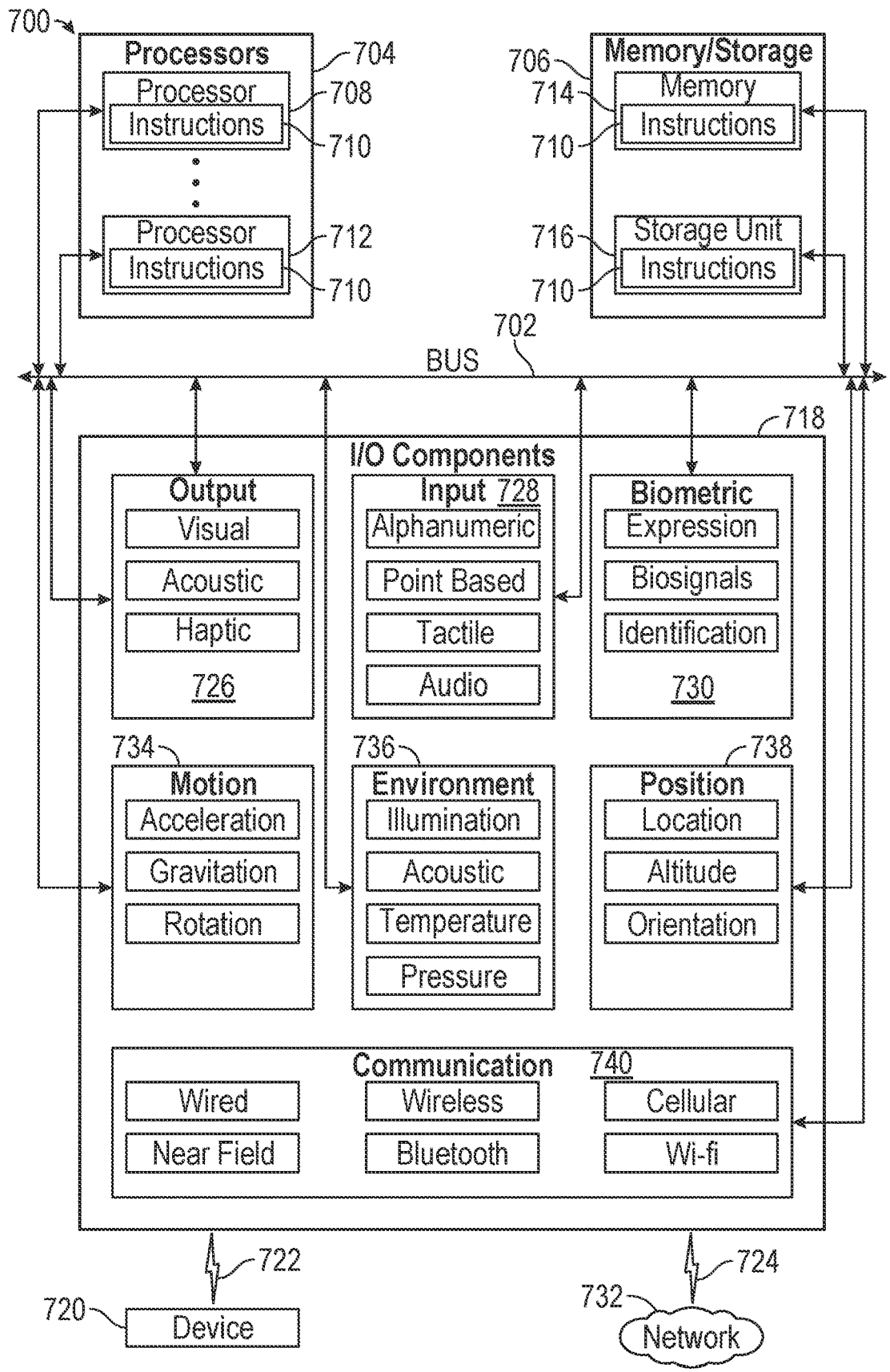
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combination thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
   a processor; and
   a memory having instructions stored thereon, when executed by the processor, causes the system to perform operations comprising:
   causing a group selectable item in a communication list interface to be displayed on a first client device, wherein the communication list interface includes a plurality of selectable items, each of the selectable items being associated with at least one other client device in communication with the first client device, wherein the group selectable item is one of the plurality of selectable items, wherein the group selectable item includes a first portion that is selectable to generate a group details request and a second portion that is selectable to cause a communication interface for a group communication session between a group of client devices to be displayed by the first client device, wherein the first portion is different from the second portion, wherein the first portion comprises a second avatar generated based on an appearance of a second user of a second client device and a third avatar generated based on an appearance of a third user of a third client device;
   receiving the group details request from the first client device, wherein the group details request is generated by the first client device when a first user selects the first portion of the group selectable item displayed on the first client device, the first user associated with the first client device; and
   in response to receiving the group details request, causing a group card interface to be displayed by the first client device, wherein the group card interface comprises a group name editing item to edit a name of the group of client devices and a location sharing selectable item that allows a location of the first client device to be shared with the group of client devices, wherein the group of client devices comprises the first client device, the second client device, and the third client device, wherein the group selectable item is separate from the group card interface and no longer visible once the group card interface is displayed, wherein the group card interface and the communication interface are not displayed simultaneously on a same interface.

2. The system of claim 1, wherein the system to perform operations further comprising:
   receiving a request for the group communication session from the first client device, wherein the request for the group communication session is generated by the first client device when the first user selects the second portion of the group selectable item displayed on the first client device.

3. The system of claim 2, wherein
   the communication interface for the group communication session is caused to be displayed by the first client device in response to receiving the request for the group communication session, wherein the group selectable item and the group card interface are separate from the communication interface and are no longer visible once the communication interface is displayed.

4. The system of claim 3, wherein the system to perform operations further comprising:
   receiving content for an electronic message from the first client device to the group of client devices for the group communication session.

5. The system of claim 4, wherein the system to perform operations further comprising:
   in response to the content for the electronic message being received, causing the group selectable item including a new message indication to be displayed by the second client device and the third client device, respectively.

6. The system of claim 1,
   wherein the group card interface includes locations of client devices in the group of client devices, a mute item that allows the first client device to stop receiving notifications associated with media content item from the group of client devices, a do not disturb item that allows the first client device to stop receiving notifications associated with the group of client devices, a clear electronic messages item that allows the first client device to clear electronic messages in a group communication session, an add member item that allows the first client device to add a fourth client device to the group of client devices, or a leaving group item that allows the first client device to be removed from the group of client devices.

7. The system of claim 1, wherein the system to perform operations further comprising:
   causing a communication list interface to be displayed on the first client device including an individual selectable item associated with the second client device that includes the second avatar.

8. The system of claim 7, wherein the system to perform operations further comprising:
   receiving a request for an individual communication session from the first client device, wherein the request for the individual communication session is generated by the first client device when the first user selects the individual selectable item associated with the second client device that is displayed on the first client device.

9. The system of claim 8, wherein the system to perform operations further comprising:
causing the communication interface for the individual communication session to be displayed at the first client device, wherein the individual communication session is between the first client device and the second client device.

10. A method comprising:
causing, by a processor, a group selectable item in a communication list interface to be displayed on a first client device, wherein the communication list interface includes a plurality of selectable items, each of the selectable items being associated with at least one other client device in communication with the first client device, wherein the group selectable item is one of the plurality of selectable items, wherein the group selectable item includes a first portion that is selectable to generate a group details request and a second portion that is selectable to cause a communication interface for a group communication session to be displayed by the first client device, wherein the first portion is different from the second portion, wherein the first portion comprises a second avatar generated based on an appearance of a second user of a second client device and a third avatar generated based on an appearance of a third user of a third client device;
receiving the group details request from the first client device, wherein the group details request is generated by the first client device when a first user selects the first portion of the group selectable item displayed on the first client device, the first user associated with the first client device; and
in response to receiving the group details request, causing a group card interface to be displayed by the first client device, wherein the group card interface comprises a group name editing item to edit a name of the group of client devices and a location sharing selectable item that allows a location of the first client device to be shared with a group of client devices, wherein the group of client devices comprises the first client device, the second client device, and the third client device, wherein the group selectable item is separate from the group card interface and no longer visible once the group card interface is displayed, wherein the group card interface and the communication interface are not displayed simultaneously on a same interface.

11. The method of claim 10, further comprising:
receiving a request for the group communication session from the first client device, wherein the request for the group communication session is generated by the first client device when the first user selects the second portion of the group selectable item displayed on the first client device.

12. The method of claim 11, wherein
the communication interface for the group communication session is caused to be displayed by the first client device in response to receiving the request for the group communication session, wherein the group communication session is between the group of client devices, wherein the group selectable item and the group card interface are separate from the communication interface and are no longer visible once the communication interface is displayed.

13. The method of claim 12, further comprising:
receiving content for an electronic message from the first client device to the group of client devices for the group communication session.

14. The method of claim 13, further comprising:
in response to the content for the electronic message being received, causing the group selectable item including a new message indication to be displayed by the second client device and the third client device, respectively.

15. The method of claim 10,
wherein the group card interface comprises locations of client devices in the group of client devices, a mute item that allows the first client device to stop receiving notifications associated with media, content item from the group of client devices, a do not disturb item that allows the first client device to stop receiving notifications associated with the group of client devices, a clear electronic messages item that allows the first client device to clear electronic messages in a group communication session, an add member item that allows the first client device to add a fourth client device to the group of client devices, or a leaving group item that allows the first client device to be removed from the group of client devices.

16. The method of claim 10, further comprising:
causing a communication list interface to be displayed on the first client device including an individual selectable item associated with the second client device that includes the second avatar.

17. The method of claim 16, further comprising:
receiving a request for an individual communication session from the first client device, wherein the request for the individual communication session is generated by the first client device when the first user selects the individual selectable item associated with the second client device that is displayed on the first client device.

18. The method of claim 17, further comprising:
causing the communication interface for the individual communication session to be displayed at the first client device, wherein the individual communication session is between the first client device and the second client device.

19. A non-transitory computer-readable storage medium having stored thereon, instructions when executed by a processor, causes the processor to perform operations comprising:
causing a group selectable item in a communication list interface to be displayed on a first client device, wherein the communication list interface includes a plurality of selectable items, each of the selectable items being associated with at least one other client device in communication with the first client device, wherein the group selectable item is one of the plurality of selectable items, wherein the group selectable item includes a first portion that is selectable to generate a group details request and a second portion that is selectable to cause a communication interface for a group communication session to be displayed by the first client device, wherein the first portion is different from the second portion, wherein the first portion comprises a second avatar generated based on an appearance of a second user of a second client device and a third avatar generated based on an appearance of a third user of a third client device;
receiving the group details request from the first client device, wherein the group details request is generated by the first client device when a first user selects the first portion of the group selectable item displayed on the first client device, the first user associated with the first client device; and in response to receiving the group details request, causing a group card interface to be displayed by the first client device, wherein the group card interface comprises a group name editing item to edit a name of the group of client devices and a location sharing selectable item that allows a location of the first client device to be shared with a group of client devices, wherein the group of client devices comprises the first client device, the second client device, and the third client device, wherein the group selectable item is separate from the group card interface and no longer visible once the group card interface is displayed, wherein the group card interface and the communication interface are not displayed simultaneously on a same interface.

20. The non-transitory computer-readable storage medium of claim 19, wherein the operations further comprising:

receiving a request for the group communication session from the first client device, wherein the request for the group communication session is generated by the first client device when the first user selects the second portion of the group selectable item displayed on the first client device.

* * * * *

UNITED STATES PATENT AND TRADEMARK OFFICE
CERTIFICATE OF CORRECTION

| | | |
|---|---|---|
| PATENT NO. | : 12,242,708 B2 | Page 1 of 1 |
| APPLICATION NO. | : 17/248636 | |
| DATED | : March 4, 2025 | |
| INVENTOR(S) | : Voss et al. | |

It is certified that error appears in the above-identified patent and that said Letters Patent is hereby corrected as shown below:

On the Title Page

On page 3, in Column 2, item (56) under "Other Publications", Lines 5-6, delete "Mar. 2,20 20"," and insert --Mar. 2, 2020",-- therefor Signed and Sealed this
Eighteenth Day of November, 2025

John A. Squires
*Director of the United States Patent and Trademark Office*